US009945582B2

(12) United States Patent
Leete et al.

(10) Patent No.: US 9,945,582 B2
(45) Date of Patent: *Apr. 17, 2018

(54) APPARATUS AND METHODS FOR PRE-HEATING WATER WITH AIR CONDITIONING UNIT OR HEAT PUMP

(71) Applicant: Rheem Manufacturing Company, Atlanta, GA (US)

(72) Inventors: Klint E. Leete, Fort Smith, AR (US); Timothy B. Hawkins, Fort Smith, AR (US); Jeremy L. Babb, Fort Smith, AR (US)

(73) Assignee: RHEEM MANUFACTURING COMPANY, Atlantic, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/207,170

(22) Filed: Jul. 11, 2016

(65) Prior Publication Data

US 2016/0320093 A1 Nov. 3, 2016

Related U.S. Application Data

(63) Continuation of application No. 14/189,192, filed on Feb. 25, 2014, now Pat. No. 9,389,000.
(Continued)

(51) Int. Cl.
*F24H 4/02* (2006.01)
*F25B 13/00* (2006.01)
(Continued)

(52) U.S. Cl.
CPC .............. *F24H 4/02* (2013.01); *F24D 15/04* (2013.01); *F24D 17/0005* (2013.01);
(Continued)

(58) Field of Classification Search
CPC ........ F25B 29/003; F25B 41/04; F25B 29/00; F25B 49/027; F25B 31/00; F25B 5/04;
(Continued)

(56) References Cited

U.S. PATENT DOCUMENTS 2,375,157 A 5/1945 Wilkes et al.
4,012,920 A 3/1977 Kirschbaum
(Continued)

FOREIGN PATENT DOCUMENTS

CN 1568417 1/2005
CN 1609518 A 4/2005
(Continued)

OTHER PUBLICATIONS

RHEEM®, "Integrated Air & Water System" Form No. S11-945, Jan. 2012, 60 pages.
(Continued)

*Primary Examiner* — Mohammad M Ali
(74) *Attorney, Agent, or Firm* — King & Spalding LLP (57) ABSTRACT

Water heater apparatus includes a tank for storing water; a heat exchanger associated with the tank and being operative to receive refrigerant and transfer heat therefrom to the tank, the heat exchanger representatively being a heat conductive tube externally wrapped around the tank in heat conductive contact therewith; air conditioning apparatus operative to utilize refrigerant flowing through a refrigerant circuit portion of the air conditioning apparatus, the refrigerant circuit portion being in fluid communication with the heat exchanger; and a control system operative to selectively cause a portion of the flowing refrigerant to pass through the heat exchanger, or cause essentially the entire flow of the refrigerant to bypass the heat exchanger.

20 Claims, 7 Drawing Sheets

Related U.S. Application Data (60) Provisional application No. 61/779,087, filed on Mar. 13, 2013.

(51) Int. Cl.

| | | |
|---|---|---|
| *F28D 1/06* | (2006.01) | |
| *F25B 49/02* | (2006.01) | |
| *F25B 29/00* | (2006.01) | |
| *F25B 41/04* | (2006.01) | |
| *F24H 4/04* | (2006.01) | |
| *F24D 17/00* | (2006.01) | |
| *F25B 5/04* | (2006.01) | |
| *F24D 17/02* | (2006.01) | |
| *F24H 6/00* | (2006.01) | |
| *F24D 15/04* | (2006.01) | |
| *F24D 19/10* | (2006.01) | |
| *F24F 5/00* | (2006.01) | |

(52) U.S. Cl.
CPC ......... *F24D 17/0031* (2013.01); *F24D 17/02* (2013.01); *F24D 19/1054* (2013.01); *F24F 5/0096* (2013.01); *F24H 4/04* (2013.01); *F24H 6/00* (2013.01); *F25B 5/04* (2013.01); *F25B 13/00* (2013.01); *F25B 29/00* (2013.01); *F25B 29/003* (2013.01); *F25B 41/04* (2013.01); *F25B 49/027* (2013.01); *F28D 1/06* (2013.01); *F24D 2200/04* (2013.01); *F24D 2200/08* (2013.01); *F24D 2200/123* (2013.01); *F24D 2200/24* (2013.01); *F24F 2221/183* (2013.01); *F25B 2339/047* (2013.01); *F25B 2400/0403* (2013.01); *F25B 2600/2501* (2013.01); *Y02B 10/70* (2013.01); *Y02B 30/12* (2013.01); *Y02B 30/52* (2013.01)

(58) Field of Classification Search
CPC ......... F25B 2400/0403; F24D 17/0031; F24D 17/02; F24D 17/0005; F24D 15/04; F24D 2200/24; F24D 2200/04; F24D 2200/08; F24D 2200/1213; F24F 5/0069; F24F 2221/183; F24H 4/04; F24H 6/00; Y02B 30/12; Y02B 30/52; Y02B 10/70
USPC .................................................. 62/79, 258.1
See application file for complete search history.

(56) References Cited

U.S. PATENT DOCUMENTS

| | | |
|---|---|---|
| 4,215,551 A | 8/1980 | Jones |
| 4,227,382 A | 10/1980 | Coyne |
| 4,238,933 A | 12/1980 | Coombs |
| 4,241,588 A | 12/1980 | Murphy et al. |
| 4,281,519 A | 8/1981 | Spath et al. |
| 4,293,323 A | 10/1981 | Cohen |
| 4,350,024 A | 9/1982 | Moll |
| 4,356,706 A | 11/1982 | Baumgarten |
| 4,386,500 A | 6/1983 | Sigafoose |
| 4,391,104 A | 7/1983 | Wendschlag |
| 4,448,347 A | 5/1984 | Dunstan |
| 4,449,375 A | 5/1984 | Briccetti |
| 4,452,050 A | 6/1984 | Pierce |
| 4,575,001 A | 3/1986 | Oskarsson et al. |
| 4,599,870 A | 7/1986 | Hebert et al. |
| 4,645,908 A | 2/1987 | Jones |
| 4,685,307 A * | 8/1987 | Jones ................ F24D 11/0214 62/160 |
| 4,693,089 A | 9/1987 | Bourne et al. |
| 5,003,788 A | 4/1991 | Fischer |
| 5,050,394 A | 9/1991 | Dudley et al. |
| 5,081,846 A | 1/1992 | Dudley et al. |
| 5,105,633 A | 4/1992 | Briggs |
| 5,269,153 A | 12/1993 | Cawley |
| 5,495,723 A | 3/1996 | MacDonald |
| 5,526,649 A | 6/1996 | Sada |
| 5,575,159 A | 11/1996 | Dittell |
| 5,628,200 A | 5/1997 | Pendergrass |
| 5,755,111 A | 5/1998 | Toyama |
| 5,906,104 A | 5/1999 | Schwartz et al. |
| 6,357,245 B1 | 3/2002 | Weng |
| 7,040,108 B1 | 5/2006 | Flammang |
| 7,721,560 B2 | 5/2010 | Carpenter |
| 8,037,931 B2 | 10/2011 | Penev et al. |
| 8,356,481 B2 | 1/2013 | Penev |
| 2002/0092311 A1 | 7/2002 | James |
| 2004/0144528 A1 | 7/2004 | Kunimoto |
| 2004/0177628 A1 | 9/2004 | Kurata et al. |
| 2005/0109490 A1 | 5/2005 | Harmon |
| 2005/0183432 A1 | 8/2005 | Cowans et al. |
| 2006/0042285 A1 | 3/2006 | Heberle |
| 2006/0064995 A1 | 3/2006 | Rigal et al. |
| 2006/0179874 A1 | 8/2006 | Barger |
| 2006/0191495 A1 | 8/2006 | Sun |
| 2006/0213210 A1 | 9/2006 | Tomlinson et al. |
| 2007/0068178 A1 | 3/2007 | Honma et al. |
| 2007/0295018 A1 * | 12/2007 | Williams ................ F24D 17/02 62/238.6 |
| 2008/0104986 A1 | 5/2008 | Gordon |
| 2008/0236185 A1 | 10/2008 | Choi et al. |
| 2008/0245087 A1 | 10/2008 | Orcutt |
| 2009/0026281 A1 | 1/2009 | McGreevy |
| 2009/0049857 A1 * | 2/2009 | Murakami ............. F25B 13/00 62/324.6 |
| 2009/0120110 A1 | 5/2009 | Grabon et al. |
| 2009/0248212 A1 | 10/2009 | Cowans |
| 2010/0000709 A1 | 1/2010 | Chang |
| 2010/0083950 A1 | 4/2010 | Bloxam |
| 2010/0209084 A1 | 8/2010 | Nelson et al. |
| 2011/0120168 A1 | 5/2011 | Choi et al. |
| 2011/0259025 A1 | 10/2011 | Noh et al. |
| 2012/0011866 A1 * | 1/2012 | Scarcella .................. F25B 1/10 62/79 |
| 2012/0060521 A1 | 3/2012 | Roetker et al. |
| 2012/0102991 A1 | 5/2012 | Lee et al. |
| 2012/0312045 A1 | 12/2012 | Kim |
| 2013/0104574 A1 | 5/2013 | Dempsey et al. |
| 2014/0230477 A1 | 8/2014 | Furui |
| 2014/0260358 A1 | 9/2014 | Leete et al. |
| 2014/0260392 A1 | 9/2014 | Hawkins et al. |

FOREIGN PATENT DOCUMENTS

| | | |
|---|---|---|
| CN | 200972229 Y | 11/2007 |
| CN | 101614451 A | 12/2009 |
| DE | 10058273 | 5/2002 |
| EP | 0138568 A2 | 4/1985 |
| EP | 0151493 | 8/1985 |
| EP | 0240441 | 10/1987 |
| EP | 2103884 | 9/2009 |
| EP | 2360439 | 8/2011 |
| EP | 2489972 | 8/2012 |
| EP | 2538145 | 12/2012 |
| JP | H11 270920 | 10/1999 |
| JP | 2011094931 | 5/2011 |
| WO | WO 90/02300 | 3/1990 |
| WO | WO 2003036178 | 5/2003 |
| WO | WO 2006039580 | 4/2006 |
| WO | WO 2006128263 | 12/2006 |
| WO | WO 2006128264 | 12/2006 |
| WO | WO 2007146050 | 12/2007 |
| WO | WO 2010/093516 A2 | 8/2010 |
| WO | WO 2012/041225 | 4/2012 |
| WO | WO 2013061473 | 5/2013 |

OTHER PUBLICATIONS

International Search Report and Written Opinion issued for PCT/US2014/018699 dated Jun. 13, 2014, 8 pages.
First Office Action dated Jan. 17, 2017 for Chinese Application No. 201480024058.8.

(56) References Cited

OTHER PUBLICATIONS

Second Examination Report dated Mar. 17, 2017 for Australian Application No. 2014243719.
Examiner's Requisition dated Jun. 28, 2017 for Canadian Application No. 2,906,662.
Canadian Office Action dated Aug. 23, 2016, for corresponding Application No. 2,906,662.
Pre-Examination Processing Notice (detailed) dated Feb. 15, 2016 for Australian Application No. 2014243719.
International Search Report and Written Opinion for corresponding PCT application No. PCT/US2014/026894, dated Jul. 15, 2014.

* cited by examiner

APPARATUS AND METHODS FOR PRE-HEATING WATER WITH AIR CONDITIONING UNIT OR HEAT PUMP

CROSS-REFERENCE TO RELATED APPLICATION

The present application claims the benefit of the filing date of provisional U.S. patent application 61/779,087 filed Mar. 13, 2013 and is a continuation of Ser. No. 14/189,192, filed Feb. 25, 2014. The entire disclosures of these applications are hereby incorporated by reference herein.

BACKGROUND OF THE INVENTION

Various apparatus and methods have previously been proposed for preheating water in a water heater tank using refrigerant from air conditioning apparatus such as an air conditioner with a non-reversible refrigerant circuit, or a heat pump having a reversible refrigerant circuit. However, such previously proposed apparatus and methods have often proven to be undesirably complex and expensive for use in many applications. It would be desirable to provide such apparatus and methods that efficiently utilize air conditioning apparatus refrigerant heat to preheat water. It is to this goal that the present invention is primarily directed.

DETAILED DESCRIPTION

As used herein, the term "air conditioning apparatus" encompasses apparatus useable to change the temperature of air being delivered to a conditioned space and having an associated refrigerant circuit. Thus, "air conditioning apparatus" may comprise (1) an air conditioning unit (or "air conditioner") having a non-reversible refrigerant circuit that may be used to cool air delivered to a conditioned space, or (2) a heat pump having a reversible refrigerant circuit that may be used to heat or cool air delivered to a conditioned space.

Typical residential air conditioning apparatus removes heat from a house and transfers it to the environment outside the house. In carrying out principles of the present invention, a portion of that heat may be captured and used to pre-heat water in the home's water heater to a temperature below the set point temperature of the water heater. The electric element(s) or gas burner in the water heater provides additional heat to bring the water temperature up to the set point temperature of the water heater. A heat pump in either its heating or cooling mode may also be used to pre-heat water in a water heater in accordance with principles of the present invention.

Figure 1:
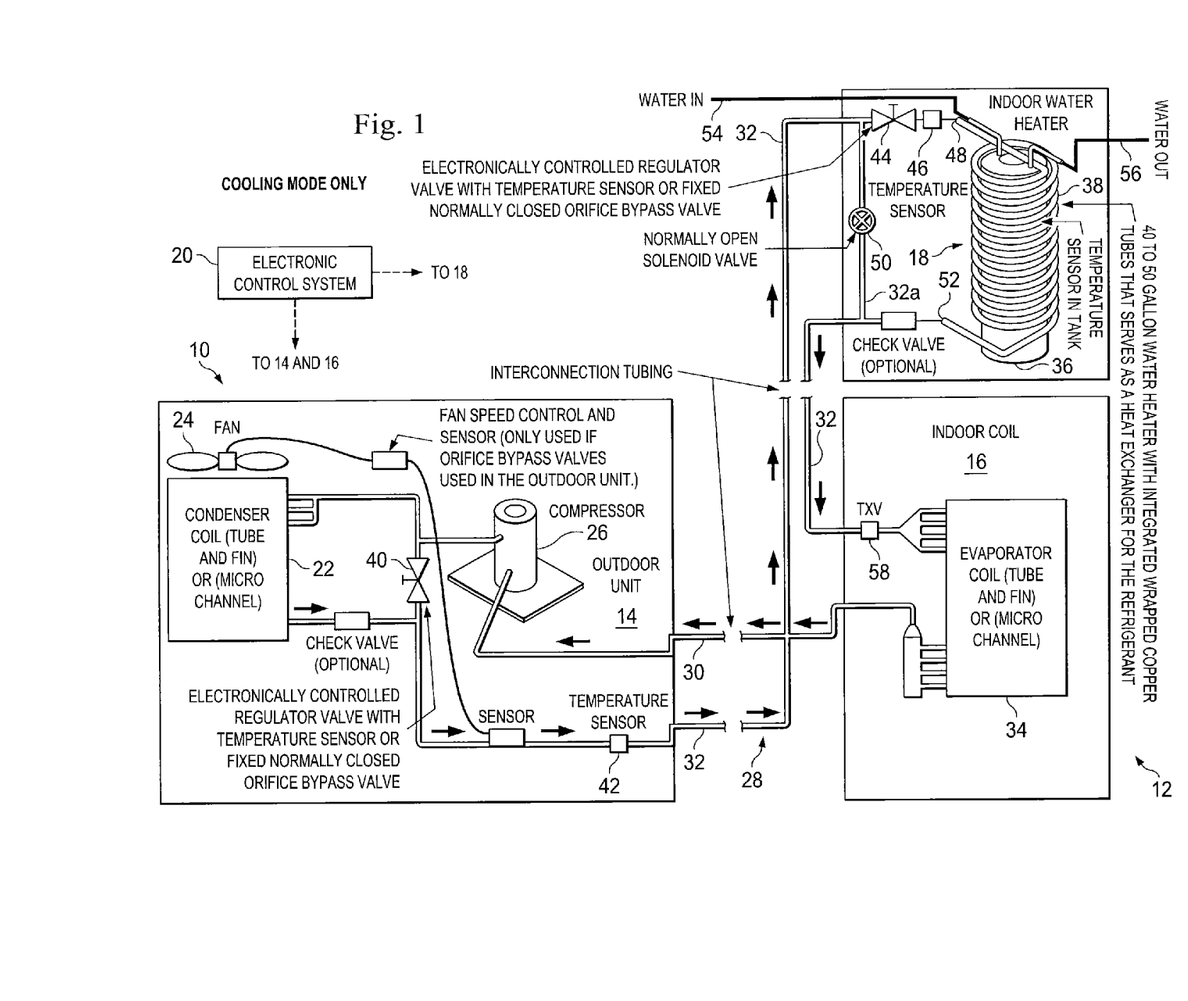
FIG. 1 is a schematic diagram of an air conditioner/water heater circuit embodying principles of the present invention, with the air conditioner providing only conditioned space air cooling.
Figure 2:
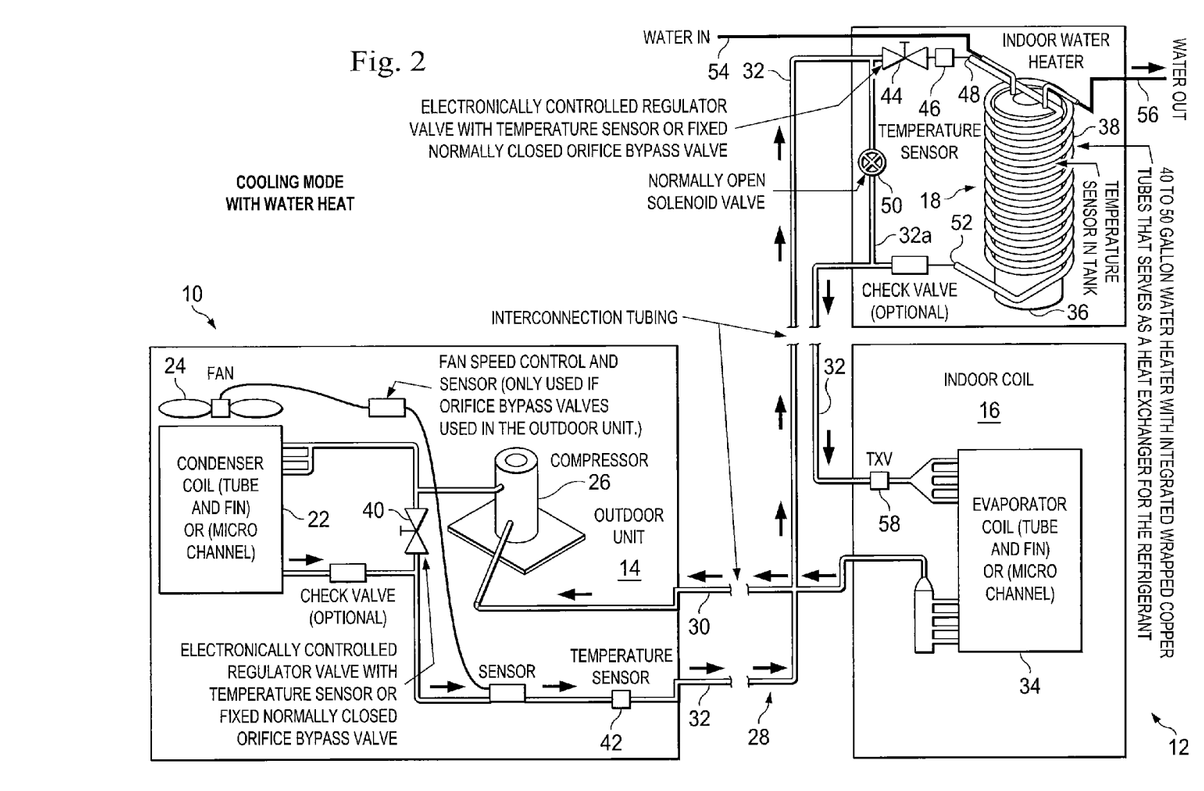
FIG. 2 is a schematic diagram similar to that in FIG. 1, but with the air conditioner being in its air cooling mode and also providing refrigerant heat to a single water heater.

An air conditioner/water heater circuit 10 embodying principles of the present invention is schematically depicted in FIGS. 1 and 2 and includes (1) an air conditioner 12 having an outdoor condensing unit 14 and an indoor coil unit 16, and (2) an associated water heater 18 which, representatively, may be a gas-fired or electric water heater. In FIG. 1 the air conditioner 12 is in an air cooling only mode, and in FIG. 2 is in an air cooling mode and further provides supplemental, refrigerant-based heat to the water heater 18. The various functions of the air conditioner/water heater circuit 10 are controlled by a schematically depicted electronic control circuit 20 (shown only in FIG. 1) which operates various subsequently described components of the overall circuit 10.

Referring initially to FIG. 1, the outdoor condensing unit 14 includes a condenser coil 22 and associated condenser fan 24, and a compressor 26. The condenser coil 22 and compressor 26 are coupled, as shown, by a refrigerant tubing circuit 28 having suction and liquid line portions 30 and 32, to the indoor unit evaporator coil 34 and to a heat conductive refrigeration tube spiral-wrapped around a metal tank portion 36 of the water heater 18 and serving as a refrigerant-to-tank water heat exchanger 38 for the water heater 18.

Operatively linked to the electronic control system 20 are (1) an electronically controlled regulator valve 40 with an associated refrigerant temperature sensor 42 installed as shown in the refrigerant tubing circuit 28 within the condensing unit 14, (2) an electronically controlled regulator valve 44 and an associated refrigerant temperature sensor 46 installed as shown in the refrigerant tubing circuit 28 adjacent the refrigerant inlet 48 of the coiled heat exchanger 38, and (3) a normally open solenoid valve 50 installed in a refrigerant bypass line 32a between the heat exchanger inlet 48 and the heat exchanger refrigerant outlet 52. As illustrated in FIG. 1, water to be heated is flowed into the water heater tank 36 via a water inlet pipe 54, and, in response to a heated water demand, is discharged from the tank 36 via a hot water supply pipe 56.

Still referring to FIG. 1, with the air conditioner 12 in its air cooling only mode, without the water heater 18 needing refrigerant heat to be transferred to the water in its tank 36 via the heat exchanger 38, gaseous refrigerant if transferred from the evaporator coil 34 to the compressor 26 via the suction line 30, with the compressor 26 causing hot refrigerant liquid to flow through and be cooled by the condenser coil 22. The electronic control system 20 maintains the solenoid valve 50 in its normally open position, and holds the regulator valves 40, 44 in closed positions such that liquid exiting the condenser coil 22 flows through the open solenoid valve 50, bypassing the water heater heat exchanger 38, and flows, via tubing portion 32, through the expansion valve 58 into and through the evaporator coil 34. Cooled gaseous refrigerant discharged from the evaporator coil 34 is then returned to the compressor 26 via suction line 30. Air (not shown) flowed over the evaporator coil 34 is cooled and flowed to a conditioned space served by the air conditioner 12.

Turning now to FIG. 2, when the water heater 18 requires refrigerant heat (as determined by a non-illustrated temperature sensor in a bottom portion of the tank 36), the control system 20 (FIG. 1) appropriately positions the various previously described valves 40, 44, 50 to which it is linked to cause a portion of the hot refrigerant traversing the tubing circuit 28 to pass through the heat exchanger 38, thereby adding refrigerant heat to the water in the water heater tank 36, before joining the hot refrigerant flow exiting the valve 50 and bypassing the heat exchanger 38 for flow therewith to the evaporator coil 34. When the control system 20 detects that the water heater 18 no longer needs refrigerant heat, it returns the air conditioner 12 to its FIG. 1 air cooling mode in which all of the refrigerant flow traversing the tubing circuit 28 bypasses the water heater coiled tube heat exchanger 38 for the additional electric or gas-fired water heater 18a.

Figure 3:
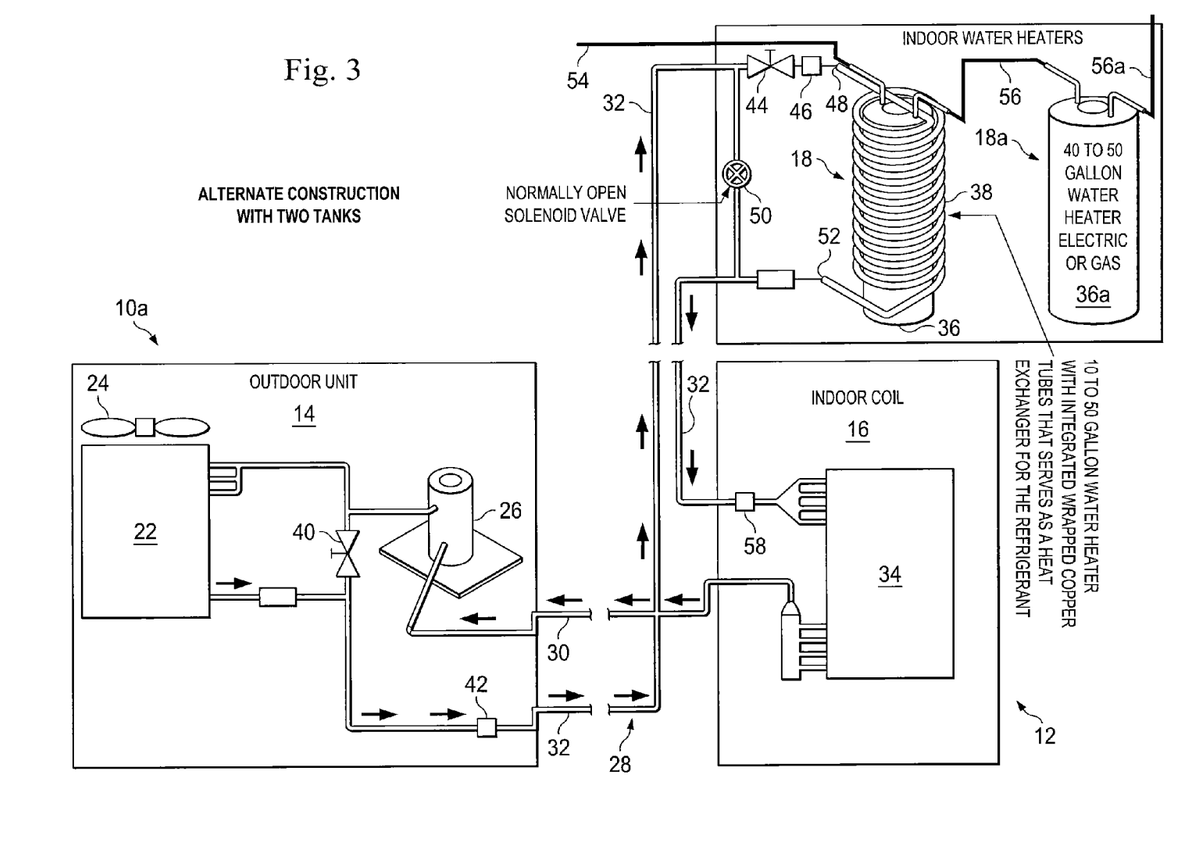
FIG. 3 is a schematic diagram similar to that in FIG. 2, but with the air conditioner providing refrigerant heat to one of the water heater tanks in a two water heater tank arrangement.

The overall air conditioner/water heater circuit 10a schematically depicted in FIG. 3 is identical to the previously described air conditioner/water heater circuit 10 with the exceptions that (1) an additional water heater 18a, having either electric or gas heating apparatus associated therewith, but without an associated coiled tube refrigerant-to-water heat exchanger, is connected in series with the previously described water heater 18 such that water exiting the water heater 18 via pipe 56 is flowed through the additional water heater 18a and then discharged therefrom through a hot water outlet pipe 56a, and (2) the water heater 18 is not provided with electric or gas heat, but receives only refrigerant heat via its tubing heat exchanger portion 38, thus functioning solely as a water preheating device.

This two tank configuration allows hot water to be stored when the air conditioner unit 12 (or a heat pump as later described herein) is running during times when there is little or no demand for hot water, thereby providing additional low cost hot water capacity during periods of time when the demand for hot water is high. It also improves the efficiency of the air conditioning unit or heat pump compared to the previously described single tank arrangement since the water in the preheater tank 18 will usually be at a lower temperature than the water temperature in the main tank 18a during periods of time when there is little or demand for hot water.

Figure 4:
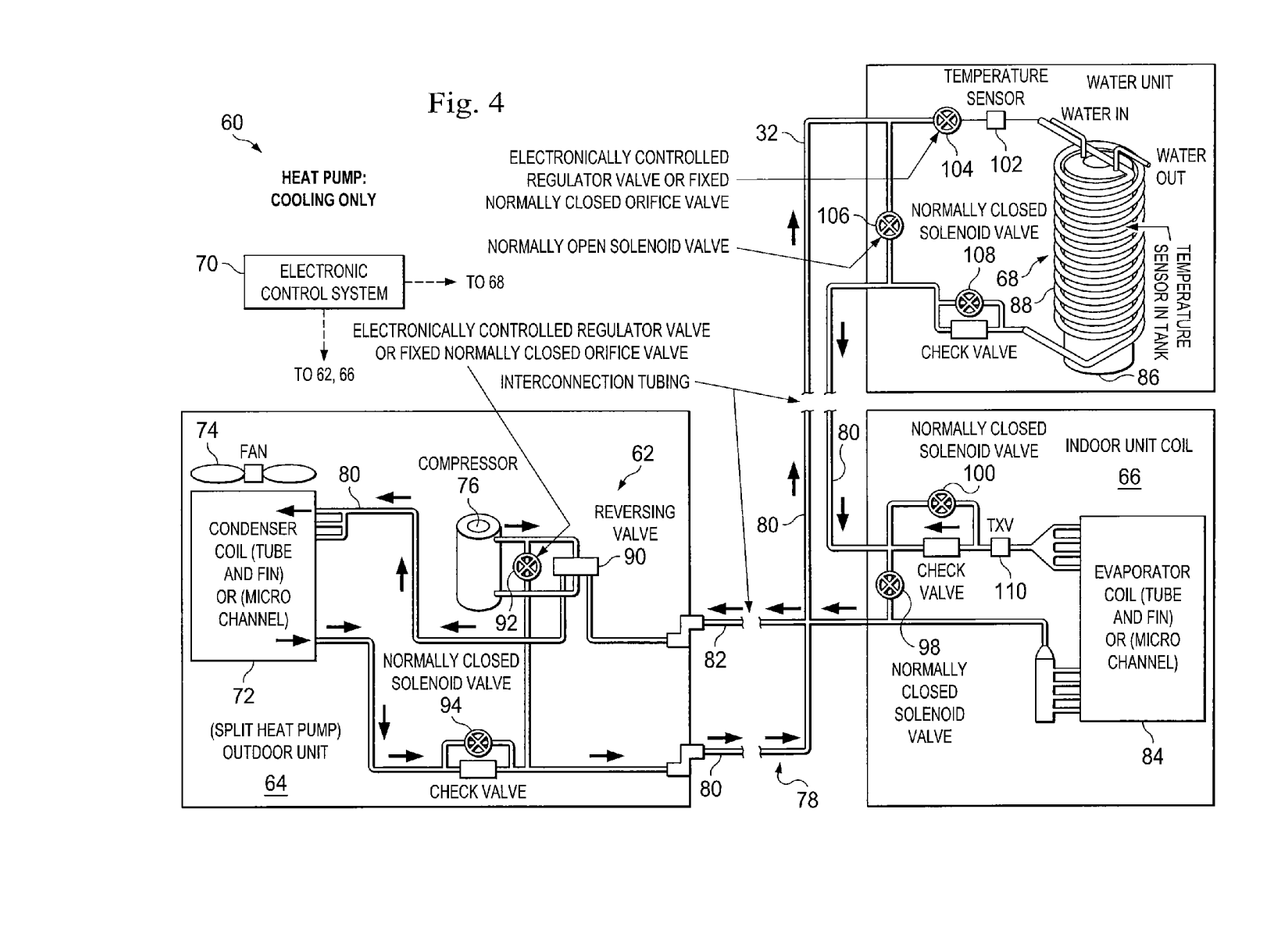
FIG. 4 is a schematic diagram of a heat pump/water heater circuit embodying principles of the present invention, with the heat pump being in its air cooling mode.
Figure 5:
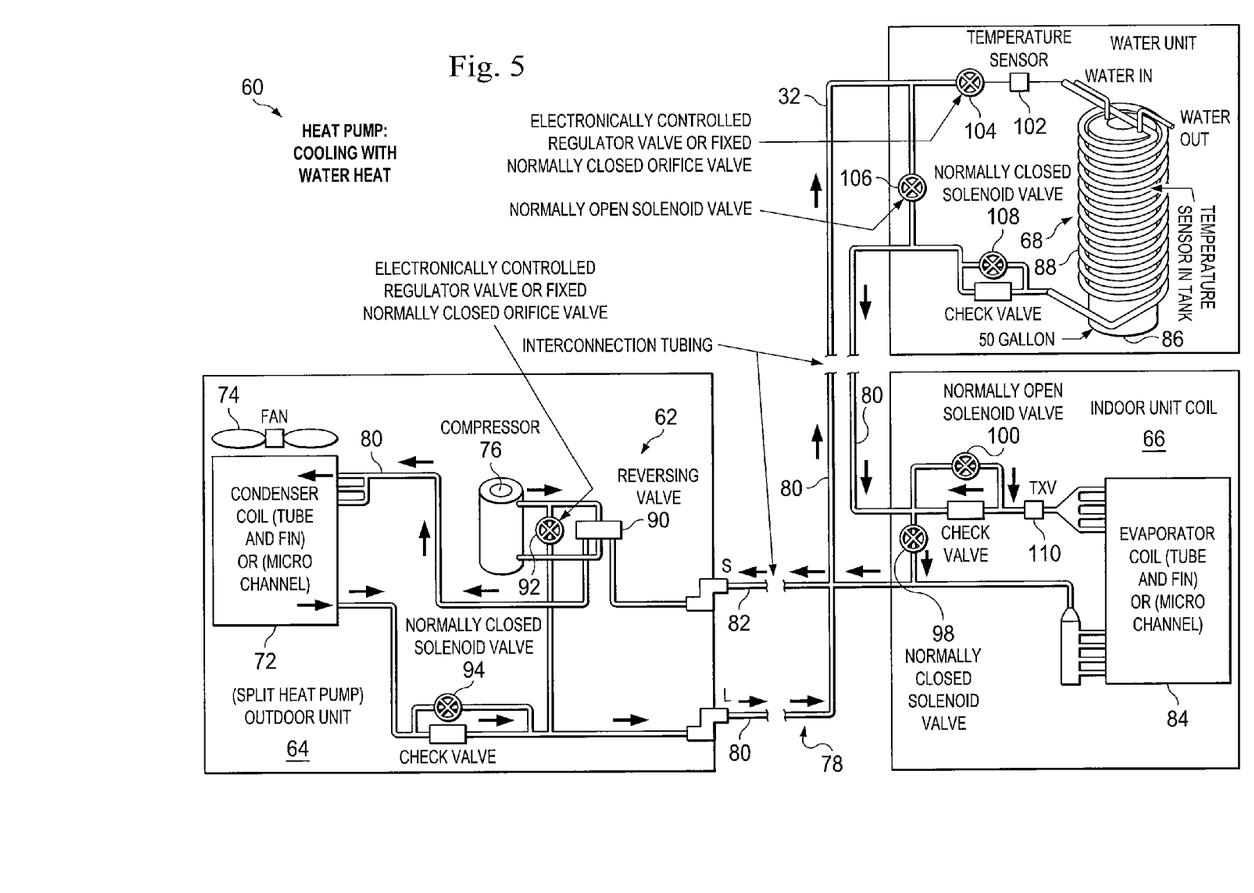
FIG. 5 is a schematic diagram similar to that in FIG. 4, but with the heat pump being in its air cooling mode and also providing refrigerant heat to the water heater.
Figure 6:
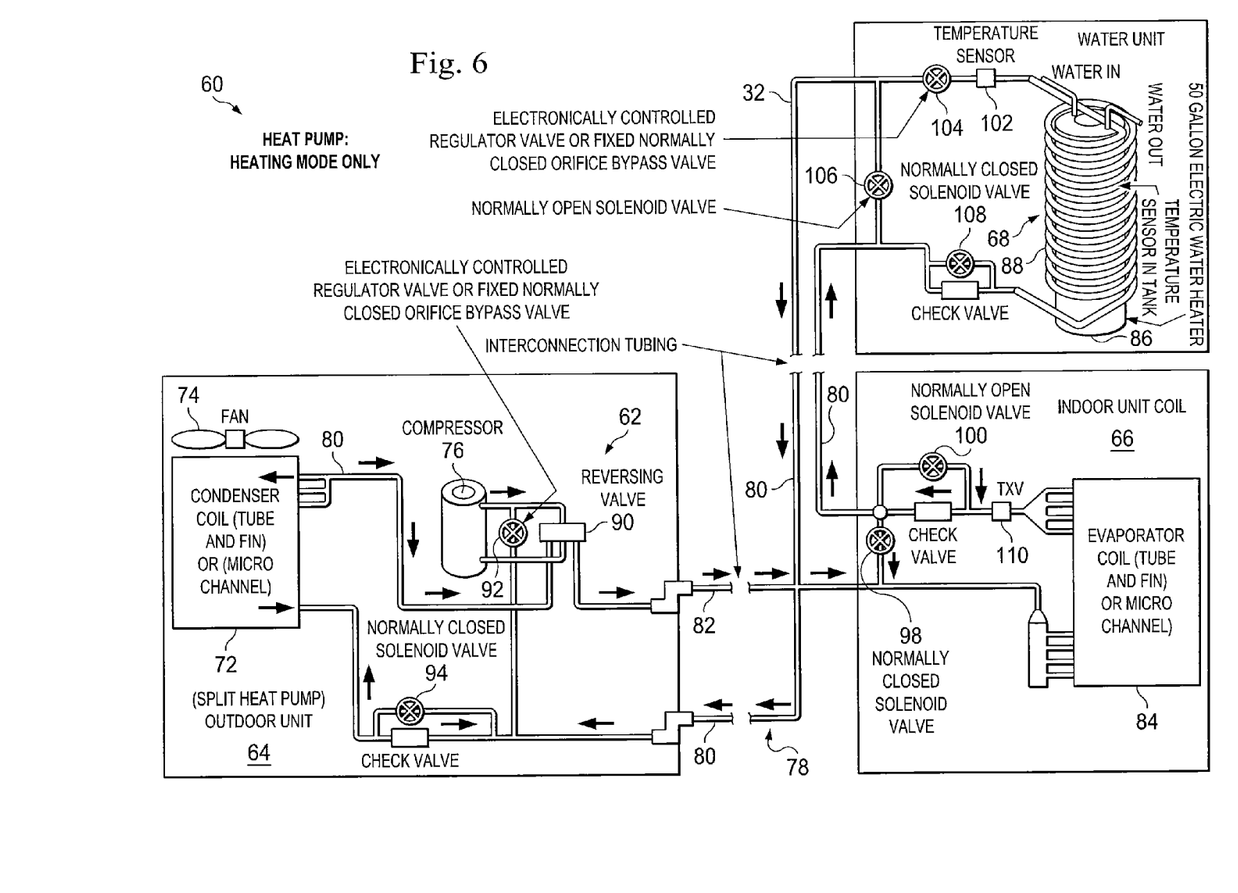
FIG. 6 is a schematic diagram similar to that in FIG. 4, but with the heat pump being in its air heating mode without also providing refrigerant heat to the water heater.
Figure 7:
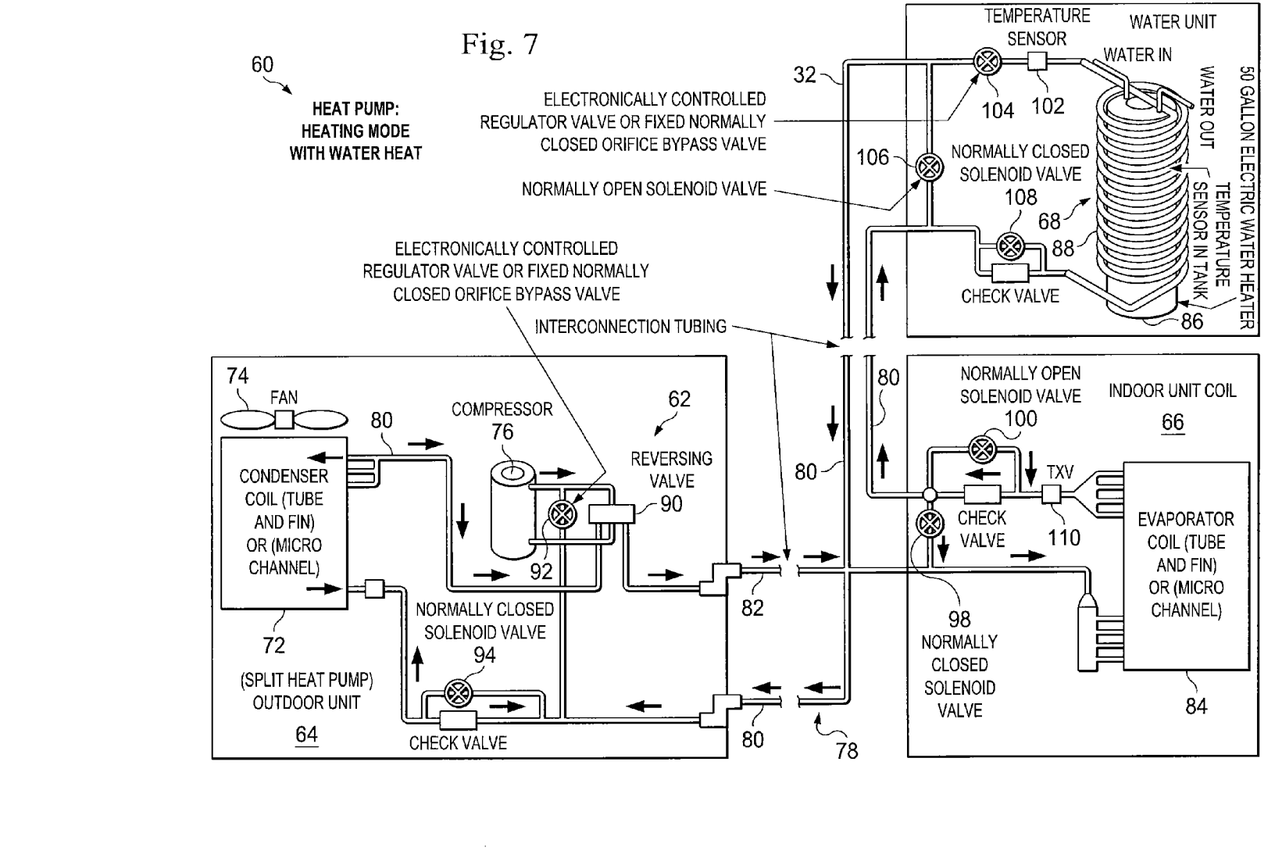
FIG. 7 is a schematic diagram similar to that in FIG. 4, but with the heat pump being in its air heating mode and also providing refrigerant heat to the water heater.

A heat pump/water heater circuit 60 embodying principles of the present invention is schematically depicted in FIGS. 4-7 and includes (1) a heat pump 62 having an outdoor unit 64 and an indoor coil unit 66, and (2) an associated water heater 68 which, representatively, may be a gas-fired or electric water heater. In FIG. 4 the heat pump 62 is in an air cooling only mode. In FIG. 5 the heat pump 62 is in an air cooling mode and further provides supplemental, refrigerant-based water preheating to the water heater 68. In FIG. 6 the heat pump 62 is in an air heating only mode. In FIG. 7 the heat pump 62 is in an air heating mode and further provides supplemental, refrigerant-based water preheating to the water heater 68. The various functions of the heat pump/water heater circuit 60 are controlled by a schematically depicted electronic control circuit 70 (shown only in FIG. 4) which operates various subsequently described components of the circuit 60.

As shown in FIGS. 4-7, the outdoor unit 64 includes a condenser coil 72 and associated fan 74, and a compressor 76. The condenser coil 72 and compressor 76 are coupled, as shown, by a refrigerant tubing circuit 78 having line portions 80 and 82, to the indoor unit evaporator coil 84 and to a heat conductive copper tube spiral-wrapped around a metal tank portion 86 of the water heater 68 and serving as a refrigerant-to-tank water heat exchanger 88 for the water heater 68.

The outdoor unit 64 has a reversing valve 90, an electronically controlled regulator valve 92, and a normally closed solenoid valve 94 connected as shown in the tubing circuit 78 and operatively linked to the electronic control system 70. The indoor coil unit 66 has a normally closed solenoid valve 98 and a normally open solenoid valve 100 connected as shown in the tubing circuit 78 and operatively linked to the electronic control system 70. The water heater 68 has a temperature sensor 102, an electronically controlled regulator valve 104, a normally open solenoid valve 106, and a normally closed solenoid valve 108 connected as shown in the tubing circuit 78 and operatively linked to the electronic control system 70.

Turning now to FIG. 4, with the heat pump/water heater system 60 in an air cooling only mode, the electronic control system sets the previously described valve components in the tubing circuit 78 in a manner such that the compressor 76 causes refrigerant discharged therefrom to flow, via tubing portion 80 of the tubing circuit 78, sequentially through the condenser coil 72 to the water heater 68 where the refrigerant, due to the closure of the regulator valve 104, bypasses the heat exchanger 88 through the open solenoid valve 106. The liquid refrigerant then flows through tubing portion 80 through the expansion valve 110 into and through the evaporator coil 84, and finally (as gaseous refrigerant) flows back to the compressor 76. Air (not shown) flowed over the evaporator coil 84 is cooled and flowed to a conditioned space served by the heat pump 62.

When a temperature sensor (not shown) of the water heater 68 calls for refrigerant heat while the heat pump 62 is in a cooling mode thereof, the electronic control system 70 appropriately repositions the water heater regulator valve 104 and the normally open solenoid valve 106 such a portion of the hot refrigerant flows through the heat exchanger 88 and back into the tubing portion 80, thereby adding refrigerant heat to the tank water, with the remainder of the hot refrigerant approaching the water heater 68 bypassing it and flowing with the refrigerant exiting the heat exchanger 88 through the expansion valve 110 and the evaporator coil 84 back to the compressor 76 via the tubing portion 82.

With the heat pump/water heater system 60 switched to its air heating only mode as shown in FIG. 6, the electronic control system 70 (FIG. 4) switches the reversing valve 90, and adjusts other tubing circuit valve components, in a manner such that hot refrigerant discharged from the compressor 76 initially flows, via tubing portion 82 of the tubing circuit 78, to the evaporator coil 84 (now functioning as an air heating coil). A portion of this refrigerant flow bypasses the coil 84 (through partially opened valve 98) and enters tubing portion 80 downstream of the coil 84, with the refrigerant flow exiting the coil 84 via the expansion valve 110 mixing with the bypassing refrigerant for delivery therewith to the water heater 68 via the tubing portion 80. This mixed refrigerant flow, via the closure of the valve 104, entirely bypasses the heat exchanger 88, via the open solenoid valve 106, and then sequentially flows, via the tubing portion 80 and the opened valve 94, through the expansion valve portion (not shown) of the condenser coil 72, the condenser coil 72 (which extracts heat from outside air), and then back to the compressor 76.

Finally, as shown in FIG. 7, if the electronic control system 70 (FIG. 4) detects that the water heater 68 needs refrigerant heat when the heat pump 62 is in an air heating mode, the control system 70 appropriately adjusts the water heater valves 104, 106, 108 in a manner such that a portion of the mixed refrigerant flow to the water heater 68 flows through the coiled tubing heat exchanger 88 to add refrigerant heat to the tank water, with the balance of the mixed refrigerant flow bypassing the heat exchanger 88 via the valve 106.

In the case of either the previously described air conditioning unit 12 or the heat pump 62, when the temperature of the water in the lower portion of the water heater tank reaches a predetermined temperature, appropriate ones of the valve components in the outdoor unit and water heater are positioned by the electronic control system (20 or 70 as the case may be) to return the air conditioning unit or heat pump system to its normal operational mode (cooling or heating without refrigerant heat transfer to the water heater tank water).

In optional constructions of the air conditioning and heat pump systems 10, 60 described above, the electronically controlled regulator valves may be replaced with fixed orifice solenoid valves, and the flow of hot refrigerant to the water heater refrigerant-to-water heat exchanger coils may instead be regulated by the compressor discharge (head) pressure using an outdoor or indoor fan speed controller which is, in turn, controlled by the sensed water temperature in the water heater tank.

The foregoing detailed description is to be clearly understood as being given by way of illustration and example only, the spirit and scope of the present invention being limited solely by the appended claims.

What is claimed is:

1. An apparatus for heating water, comprising:
    an air conditioning apparatus operative to utilize refrigerant flowing through a refrigerant circuit portion of said air conditioning apparatus to regulate the temperature of air being delivered to a conditioned space;
    a tank for storing water;
    a heat exchanger associated with said tank and being operative to receive refrigerant and transfer heat therefrom to said tank, the heat exchanger comprising a first end forming a part of the refrigerant circuit portion and a second end forming a part of the refrigerant circuit portion,
    a first valve disposed at the first end of the heat exchanger and arranged to control flow of refrigerant at the first end of the heat exchanger;
    a second valve disposed at the second end of the heat exchanger and arranged to control flow of refrigerant at the second end of the heat exchanger; and
    a bypass circuit forming a part of the refrigerant circuit portion and arranged to selectively flow refrigerant in a manner bypassing the heat exchanger, the first valve, and the second valve.

2. The apparatus of claim 1, wherein the bypass circuit comprises a bypass valve arranged to control flow of refrigerant bypassing the heat exchanger.

3. The apparatus of claim 1, comprising:
    a temperature sensor disposed to measure a temperature of water in the tank; and
    a control system operative to selectively operate the first and second valves.

4. The apparatus of claim 3, wherein the bypass circuit comprises a bypass valve arranged to control flow of refrigerant bypassing the heat exchanger, and
    wherein when the temperature sensor detects a water temperature below a desired temperature, the control system controls both the first valve and the bypass valve to direct hot refrigerant through the heat exchanger.

5. The apparatus of claim 4, wherein when the temperature sensor detects a water temperature below a desired temperature, the control system controls both the first valve and the bypass valve to simultaneously direct only a portion of hot refrigerant through the heat exchanger and direct only a portion of hot refrigerant through the bypass circuit.

6. The apparatus of claim 1, wherein the air conditioning apparatus comprises:
    a condenser in an outdoor unit; and
    an evaporator coil in an indoor unit, the bypass circuit placing the condenser coil and the evaporator coil in communication.

7. The apparatus of claim 6, wherein the air conditioning apparatus comprises a reversing valve, and
    wherein when the temperature sensor is above a desired temperature and heated air is desired, the control system switches the reversing valve to direct hot refrigerant from the compressor to the evaporator coil, the evaporator coil functioning as an air heating coil.

8. The apparatus of claim 7, wherein when the temperature sensor is above a desired temperature and heated air is desired, the control system controls the bypass valve and at least one additional valve to direct only a portion of the hot refrigerant through the evaporator coil and to direct all the hot refrigerant flow through the bypass circuit.

9. The apparatus for heating water of claim 1, wherein the air conditioning apparatus comprises a heat pump.

10. The apparatus for heating water of claim 1, wherein the heat exchanger is the sole source of heating water in said tank.

11. The apparatus for heating water of claim 1, comprising a second tank for storing water, said second tank for storing water being piped in series with said tank for storing water, and wherein the second tank is devoid of an external refrigerant-to-water heat exchanger.

12. An apparatus for heating water, comprising:
    an air conditioning apparatus operative to utilize refrigerant flowing through a refrigerant circuit portion of said air conditioning apparatus to regulate the temperature of air being delivered to a conditioned space;
    a tank for storing water;
    a heat exchanger associated with said tank and being operative to receive refrigerant and transfer heat therefrom to said tank, the heat exchanger comprising a first end forming a part of the refrigerant circuit portion and a second end forming a part of the refrigerant circuit portion,
    a regulator valve disposed at the first end of the heat exchanger and arranged to control flow of refrigerant at the first end of the heat exchanger;
    a solenoid valve disposed at the second end of the heat exchanger and arranged to control flow of refrigerant at the second end of the heat exchanger; and
    a check valve arranged in parallel with the solenoid valve to cooperate with the solenoid valve to control flow of refrigerant at the second end of the heat exchanger.

13. The apparatus of claim 12, comprising:
    a bypass circuit forming a part of the refrigerant circuit portion and arranged to selectively flow refrigerant in a manner bypassing the heat exchanger, the first valve, and the second valve, the bypass circuit comprises a bypass valve arranged to control flow of refrigerant bypassing the heat exchanger.

14. The apparatus of claim 13, further comprising a control system in communication with the regulator valve and the bypass valve, wherein when a water temperature is below a desired temperature, the control system controls both the regulator valve and the bypass valve to direct hot refrigerant through the heat exchanger.

15. The apparatus of claim 13, wherein the air conditioning apparatus comprises:
a condenser in an outdoor unit; and
an evaporator coil in an indoor unit, the bypass circuit placing the condenser coil and the evaporator coil in communication.

16. The apparatus of claim 12, comprising:
a temperature sensor disposed to measure a temperature of water in the tank; and
a control system operative to selectively operate the regulator and solenoid valves.

17. An apparatus for heating water, comprising:
a tank for storing water;
a heat exchanger associated with said tank and being operative to receive refrigerant and transfer heat therefrom to said tank;
an air conditioning apparatus operative to utilize refrigerant flowing through a refrigerant circuit portion of said air conditioning apparatus to regulate the temperature of air being delivered to a conditioned space, said refrigerant circuit portion being in fluid communication with said heat exchanger;
a valve system comprising a plurality of valves disposed about the refrigerant circuit portion to direct the refrigerant flowing through the circuit portion;
a control system operative to control the valve system to selectively cause at least a portion of the flowing refrigerant to pass through said heat exchanger; the control system arranged in a manner that:
a) when the apparatus is in an air cooling only mode, the control system controls the valve system to direct refrigerant from a compressor sequentially through a condenser coil, through a bypass circuit bypassing the heat exchanger, through an expansion valve, and through an evaporator coil to the compressor;
b) when the apparatus is in a water heating and air cooling mode, the control system controls the valve system to direct heated refrigerant from the compressor sequentially through the condenser coil, a portion of the refrigerant through the heat exchanger, through an expansion valve, and through an evaporator coil to the compressor;
c) when the apparatus is in an air heating only mode, the control system controls the valve system to direct the refrigerant from the compressor sequentially through the evaporator coil functioning as an air heating coil, through an expansion valve, through the condenser coil to the compressor; and
d) when the apparatus is in a water heating and an air heating mode, the control system controls the valve system to direct the refrigerant from the compressor sequentially through the evaporator coil functioning as the air heating coil, an expansion valve, a portion of the refrigerant through the heat exchanger, and through the condenser coil to the compressor.

18. The apparatus of claim 17, wherein when the apparatus is in the water heating and an air cooling mode, directing a portion of the refrigerant through the heat exchanger includes directing only a portion through the heat exchanger and directing another portion through a bypass circuit bypassing the heat exchanger.

19. The apparatus of claim 17, wherein when the apparatus is in the water heating and an air heating mode, directing a portion of the refrigerant through the heat exchanger includes directing only a portion through the heat exchanger and directing another portion through a bypass circuit bypassing the heat exchanger.

20. The apparatus of claim 17, wherein the valve system comprises:
a first valve disposed at the first end of the heat exchanger and arranged to control flow of refrigerant at the first end of the heat exchanger;
a second valve disposed at the second end of the heat exchanger and arranged to control flow of refrigerant at the second end of the heat exchanger; and
a bypass valve disposed in the bypass circuit and arranged to control flow of refrigerant through the bypass circuit.

* * * * *